United States Patent
Mathew et al.

(10) Patent No.: US 9,109,702 B2
(45) Date of Patent: Aug. 18, 2015

(54) BOOT SEAL FOR MACHINE SYSTEM AND METHOD

(71) Applicant: Caterpillar, Inc., Peoria, IL (US)

(72) Inventors: Sunil I. Mathew, Peoria, IL (US); Hong Lian, Peoria, IL (US); Craig D. Goeppinger, Argenta, IL (US); Brian C. Wright, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 239 days.

(21) Appl. No.: 13/848,219

(22) Filed: Mar. 21, 2013

(65) Prior Publication Data

US 2014/0286693 A1    Sep. 25, 2014

(51) Int. Cl.
| | |
|---|---|
| *F16J 15/16* | (2006.01) |
| *F16C 11/06* | (2006.01) |
| *B62D 7/16* | (2006.01) |
| *B60G 7/00* | (2006.01) |

(52) U.S. Cl.
CPC ............. *F16J 15/16* (2013.01); *B60G 7/005* (2013.01); *B62D 7/16* (2013.01); *F16C 11/0671* (2013.01); *B60G 2204/416* (2013.01); *Y10T 29/49622* (2015.01); *Y10T 403/32606* (2015.01)

(58) Field of Classification Search
USPC ........ 280/93.511, 93.512; 403/122, 124, 125; 277/635, 637
See application file for complete search history.

(56) References Cited

U.S. PATENT DOCUMENTS

| | | | |
|---|---|---|---|
| 3,175,834 A | 3/1965 | Wallace et al. | |
| 3,322,445 A | 5/1967 | Hassan | |
| 3,468,171 A | 9/1969 | Macielinski | |
| 3,901,518 A | 8/1975 | Uchida | |
| 5,176,576 A | 1/1993 | Moulindt | |
| 6,357,956 B1* | 3/2002 | Zebolsky et al. | 403/134 |
| 7,704,007 B2 | 4/2010 | Elterman et al. | |
| 2002/0141813 A1* | 10/2002 | Davis | 403/122 |
| 2005/0250586 A1 | 11/2005 | Yamada et al. | |
| 2009/0209353 A1 | 8/2009 | Abels et al. | |
| 2010/0119297 A1* | 5/2010 | Langendoen | 403/134 |

FOREIGN PATENT DOCUMENTS

| | | |
|---|---|---|
| AU | 418260 | 10/1971 |
| WO | 2007023803 | 3/2007 |

* cited by examiner

*Primary Examiner* — Faye M Fleming
(74) *Attorney, Agent, or Firm* — BakerHostetler

(57) ABSTRACT

A machine system includes a first component, a second component, and a joint assembly pivotably connecting the first and second components in a finite angular pivoting range. A boot seal seals between the first and second components, and has a rest configuration where the boot seal has a curvilinear taper, and is deformable to a squished configuration forming a radially outward bulge. The radially outward bulge stores an energy of compression of the boot seal, to bias a sealing ring in the boot seal against the second component.

22 Claims, 5 Drawing Sheets

BOOT SEAL FOR MACHINE SYSTEM AND METHOD

TECHNICAL FIELD

The present disclosure relates generally to sealing between pivotable components in a machine system, and more particularly to axially compressing a boot seal between machine components to form therein a radially outward bulge storing an energy of the axial compression.

BACKGROUND

All manner of different types of seals are used in machine systems. In the case of machine system components movable relative to one another, providing effective fluid or debris-tight seals can present unique challenges. On the one hand, there can be inherent difficulties in excluding or preventing the escape of liquids or debris where components contacting a seal move relative to one another. The relative motion can, moreover, cause wear of the seal and/or machine components of interest. In the case of machine systems where components sought to be sealed have multiple degrees of freedom of motion, it will be appreciated that developing a sealing system which can accommodate all or even multiple different configurations of the subject components in three dimensional space, and still live for a reasonable service life, can be very difficult, often requiring field testing or simulation testing of numerous different design iterations.

U.S. Pat. No. 3,322,445 to Hassan is directed to a ball joint seal intended to limit the ingress to a joint interior of dirt, water or other foreign matter while retaining a lubricant within the seal. While Hassan may serve adequately, there are likely limitations as to the breadth of suitability of the seal outside its intended service environment.

SUMMARY OF THE INVENTION

In one aspect, a machine system includes a first machine component, a second machine component pivotable relative to the first machine component in a finite angular pivoting range, and a joint assembly connecting the first and second components and including a boot seal sealing therebetween. The boot seal defines a center axis extending between a first and a second axial end, and has a first and a second sealing ring positioned at the first and second axial ends, respectively. The first sealing ring is in radial contact with the first machine component, and the second sealing ring is in axial contact with the second machine component. The boot seal is held in axial compression between the first and second machine components, and includes a radially outward bulge storing an energy of the axial compression such that the second sealing ring is biased against the second machine component.

In another aspect, a boot seal is provided, for a joint assembly connecting first and second machine components pivotable relative to one another in a finite angular pivoting range. The boot seal includes a resilient seal body defining a center axis and including a body wall extending between a first axial body end and a second axial body end and circumferentially around the center axis. The first axial body end defines a larger diameter circular opening and the second axial body end defines a smaller diameter circular opening. A first sealing ring is positioned at the first axial body end and includes an exposed outer radial surface positionable in radial contact with the first machine component. A second sealing ring is positioned at the second axial body end and includes an exposed outer axial surface positionable in axial contact with the second machine component. The resilient seal body further defines an axial body length, and is in a rest configuration where the body wall forms a curvilinear taper extending a majority of the axial body length from the first to the second axial body end. The resilient seal body is deformable in response to axial compression between the first and second machine components to a squished configuration where the body wall forms a radially outward bulge storing an energy of the axial compression to bias the second sealing ring against the second machine component.

In still another aspect, a method of assembling a machine system includes contacting an outer radial surface of a first sealing ring positioned at a first end of a boot seal with a first component in the machine system, and contacting an outer axial surface of a second sealing ring positioned at a second end of the boot seal with a second component in the machine system. The method further includes compressing the boot seal between the first and second components, such that the boot seal deforms from a rest configuration having a curvilinear taper extending between the first and second ends, to a squished configuration forming a bulge storing an energy of the compression. The method further includes biasing the second sealing ring against the second component via the stored energy of the compression, and pivotably connecting the first component with the second component in a finite angular pivoting range, such that the boot seal is held in the squished configuration therebetween.

DETAILED DESCRIPTION

Figure 1:
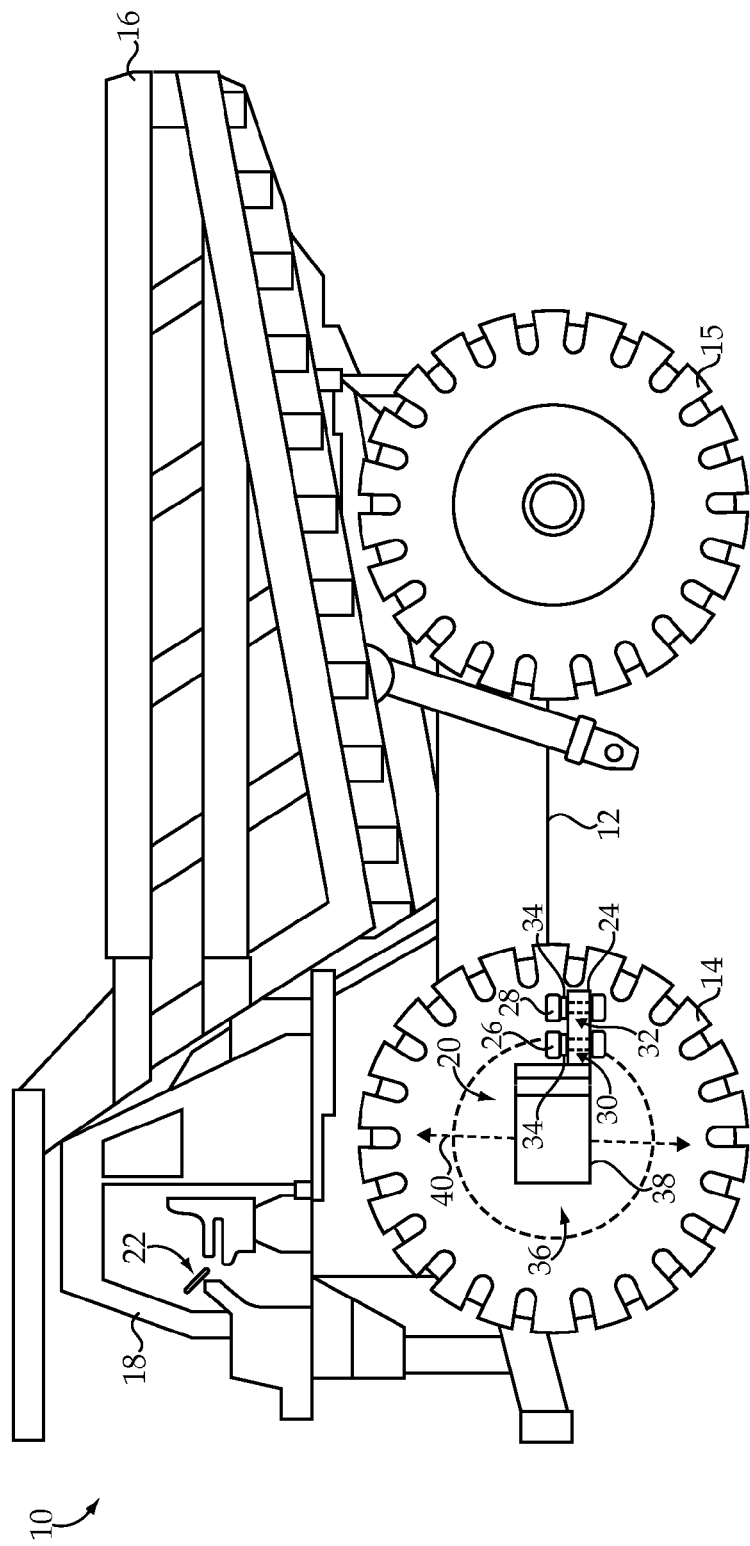
FIG. 1 is a side diagrammatic view of a machine having a machine system according to one embodiment.

Referring to FIG. 1, there is shown a machine 10 according to the present disclosure in the context of an off-highway truck having a frame 12, a dump body 16 mounted to frame 12, and each of a front and back set of ground engaging elements 14 and 15, respectively. Machine 10 also includes a machine system 20. In the illustrated example, machine system 20 includes a steering system controllable via a steering wheel 22 or the like positioned within an operator cab 18. System 20 could be autonomously operated in certain embodiments. System 20 includes a movable machine component 24, and another movable machine component 26, and components 24 and 26 may be pivotable relative to one another. Either of components 24 or 26 could be understood as a "first" or a "second" machine component for purposes of understanding the present disclosure. A joint assembly 30 connects component 24 and component 26 in a finite angular pivoting range. Joint assembly 30 includes a boot seal 34 sealing between first component 24 and second component 26. System 20 may also include another movable component 28 and another joint assembly 32 connecting component 24 and component 28, analogously pivotable in a finite angular pivoting range. Joint assembly 32 may also include a boot seal 34 sealing between component 24 and component 28. Boot seals 34 may be substantially identical to one another, and as further discussed herein additional joint assemblies and additional, substantially identical boot seals may be used elsewhere in machine system 20.

As noted above, system 20 may include a steering system, and machine 10 may include a ground-engaging machine such as a truck. Component 24 may include a steering arm, and each of components 26 and 28 may include a linkage rod for actuating component 24, as further described herein. The front ground engaging element 14 visible in FIG. 1 may be part of a wheel assembly 36, also including a wheel mount 38 configured to couple with frame 12 and supporting ground engaging element 14 for rotation about an axis 40. In parallel with such rotation of ground engaging element 14, an opposite and substantially mirror image wheel assembly not visible in FIG. 1 will similarly rotate to enable steering of machine 10 in a conventional manner. As will be further apparent from the following description, boot seals 34 may be uniquely configured to seal between the respective components, and can function in a manner negating the necessity for routine lubrication of any of the associated joint assemblies in machine system 20, providing substantial advantages over analogous systems which can require servicing to lubricate joint seals and purge debris on a daily basis, or even multiple times per day.

Figure 2:
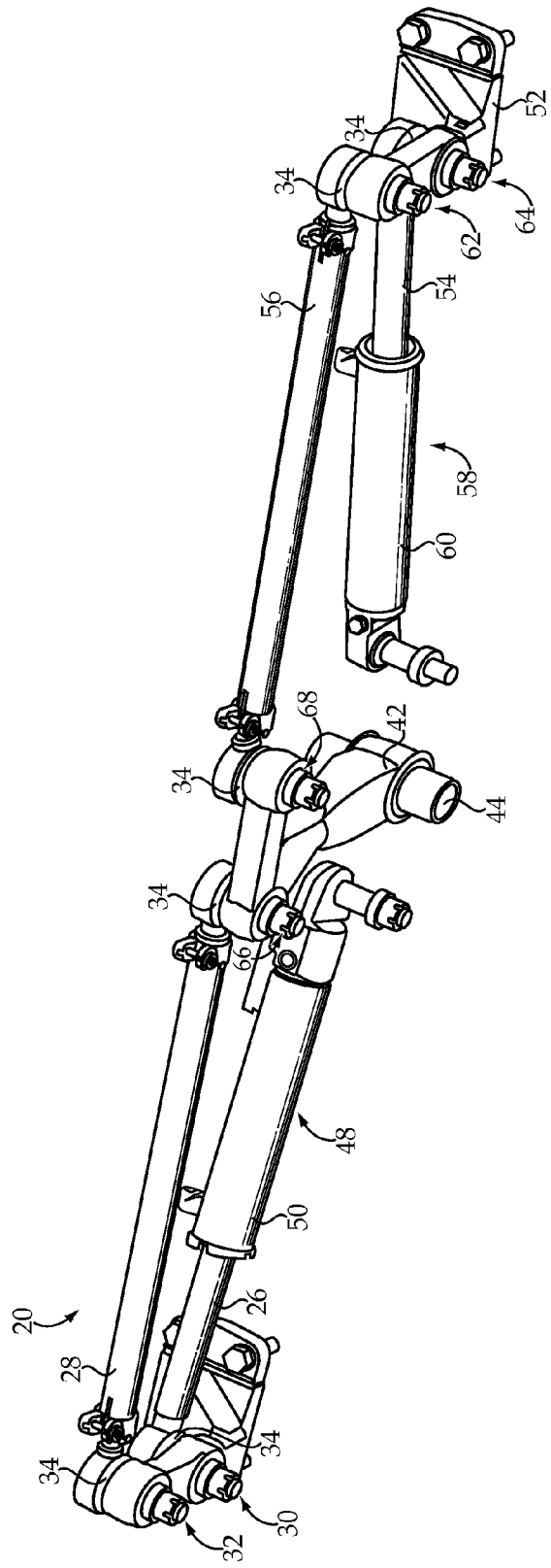
FIG. 2 is a diagrammatic view of a machine system, according to one embodiment.

Referring now to FIG. 2, there is shown system 20 in more detail. As noted above, component 24 may include a steering arm, which may further be an outer steering arm configured to couple with wheel assembly 36. System 20 may further include a pivotable center steering arm 42 having a mounting shaft 44 configured to couple with frame 12 of machine 10. As also noted above, component 26 may include a linkage rod, which may couple component 24 with frame 12. Component 28 may include a second linkage rod, coupling component 24 with center arm 42. In the embodiment shown, system 20 may further include a hydraulic actuator 48 configured to couple to frame 12 of machine 10. Actuator 48 may include a hydraulic cylinder 50, and also includes component or linkage rod 26. Those skilled in the art will thus appreciate that linkage rod 26 may be reciprocable within cylinder 50 in a conventional manner for steering machine 10. Component 28 or second linkage rod 28 may include a rigid linkage rod, as opposed to the extendable and retractable rod 26.

System 20 may further include a second outer steering arm 52, and additional linkage rods 54 and 56 pivotably coupling outer steering arm 52 with frame 12 and center arm 42. A second hydraulic actuator 58 may include linkage rod 54 and a hydraulic cylinder 60. Additional joint assemblies 62 and 64 may couple linkage rods 54 and 56 to steering arm 52 in an manner substantially identical to that described in connection with steering arm 24. Additional joint assemblies 66 and 68 may pivotably connect linkage rods 28 and 56 with center arm 42. In certain embodiments, additional joint assemblies may be used to pivotably connect actuators 48 and 58 with frame 12 in machine 10. All of the joint assemblies described herein may be substantially identical, and may each include a substantially identical boot seal 34. Accordingly, the construction of those joint assemblies and the features, function, and installation procedure respecting their boot seals may all be substantially identical at least in certain embodiments.

Figure 3:
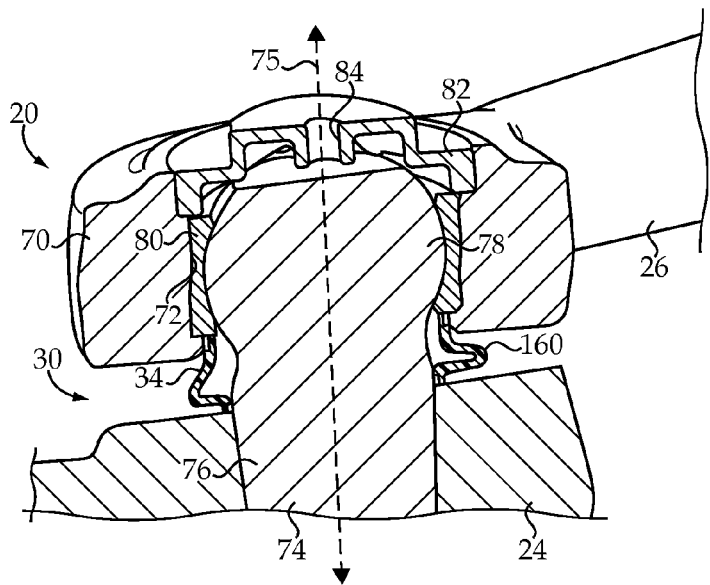
FIG. 3 is a sectioned view, in perspective, of a portion of the machine system of FIG. 2.

Referring now to FIG. 3, there are shown additional features of a joint assembly 30 in accordance with the present disclosure. In a practical implementation strategy, joint assembly 30 may include a ball joint assembly having a ball stud 74 defining a longitudinal axis 75 and including a shaft 76 held fast within component 24, and a ball 78 received within a socket eye 72 formed in a rod end 70 of component 26. Joint assembly 30 may further include a bearing 80 positioned within socket eye 72, and extending about ball 78 in a conventional manner. A cap or the like 82 is shown engaged within socket eye 72 in rod end 70. Cap 82 might be threaded into rod end 70 in certain embodiments. A port 84 is shown in cap 82, and could be used for delivery of grease or another lubricant into the interior of joint assembly 30 in a conventional manner. In many instances, joint assembly 30 will be a so-called dry joint having no lubricant, or only such lubricant as might initially be used or applied during assembly of the components. Port 84 might be blocked, or not used at all, in certain embodiments. Also shown is boot seal 34 sealing between components 24 and 26, and preventing the intrusion of water, dirt, etc.

Figure 4:
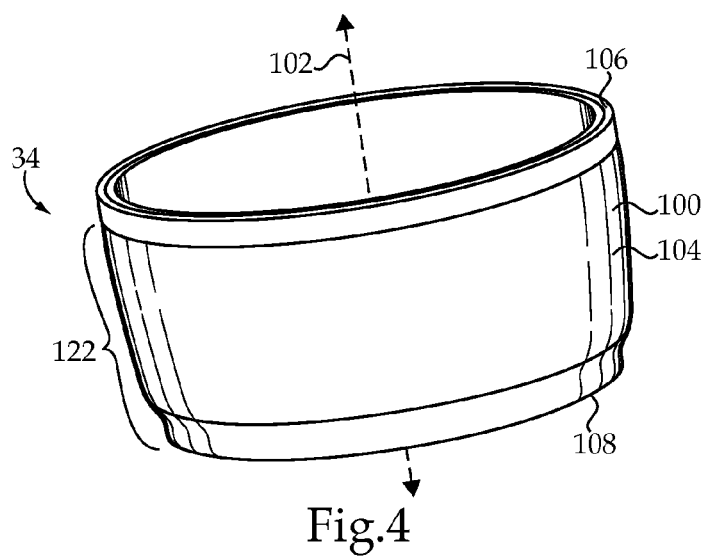
FIG. 4 is an isometric view of a boot seal, according to one embodiment.
Figure 5:
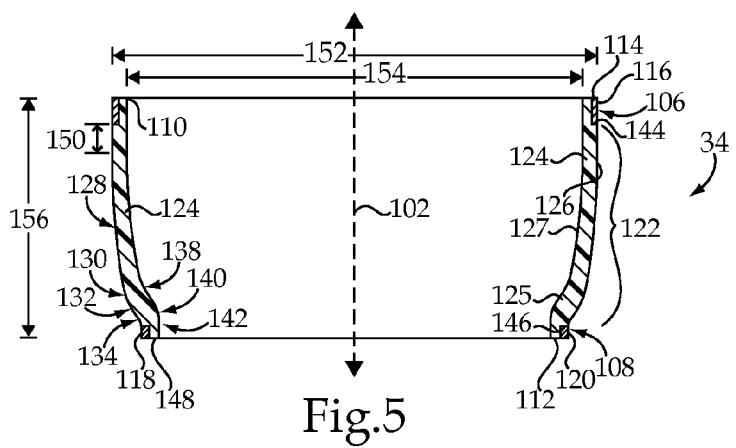
FIG. 5 is a sectioned side diagrammatic view of the boot seal of FIG. 4.

Referring also now to FIGS. 4 and 5, boot seal 34 may include a resilient seal body 100 defining a center axis 102 and including a body wall 104 extending between a first axial body end 106 and a second axial body end 108. Body wall 104 may further extend circumferentially around center axis 102, and is shaped to deform in a unique way and for purposes which will be further apparent from the following description. First axial body end 106 may define a larger diameter circular opening 110, and second axial body end 108 may define a smaller diameter circular opening 112. A first sealing ring 114 is positioned at first axial body end 106 and includes an exposed outer radial surface 116 positionable in radial contact with component 26. An unexposed or hidden inner radial surface contacts material of body wall 104. A second sealing ring 118 is positioned at second axial body end 108 and has an exposed outer axial surface 120 positionable in axial contact with component 24. In FIGS. 4 and 5, boot seal 34, more particularly seal body 100, is shown as it might appear in a rest configuration where body wall 104 forms a curvilinear taper 122 extending between first axial body end 106 and second axial body end 108. Seal body 100 further defines an axial body length 156, and taper 122 may extend a majority of length 156 between ends 106 and 108. Body wall 104, is deformable in response to axial compression of seal body 100 between components 24 and 26 to a squished configuration similar to that shown in FIG. 3, where body wall 104 forms a radially outward bulge 160 storing an energy of the axial compression to bias second sealing ring 118 against component 24. Various geometric attributes of boot seal 34 enable installation as part of joint assembly 30, and subsequent service in system 20 in a manner addressing engineering challenges and field service operating concerns as further discussed herein.

In a practical implementation strategy, body wall 104 may further include a longer wall section 124 adjacent first axial body end 106, and a shorter wall section 125 adjacent second axial body end 108. Seal body 100, more particularly body wall 104 further includes an outer wall surface 126 having a convex axial profile within wall section 124, and a concave axial profile within wall section 125. The transition from convex to concave is readily apparent in FIG. 5, and enables formation of radially outward bulge 160, and its subsequent function in service, in a desired manner. Body wall 104 may further include an inner wall surface 127 having a concave axial profile within wall section 124, and a convex axial profile within wall section 125. In addition to the profiling of outer wall surface 126 and inner wall surface 127, a relative size of the various radiuses defined by the respective wall surfaces further supports the formation and service performance of radially outward bulge 160.

In one embodiment, the convex axial profile of outer wall surface 126 in wall section 124 defines a larger radius of curvature 128, and the concave axial profile of inner wall surface 127 in wall section 124 defines a smaller radius of curvature 136, such that a radial thickness of body wall 104 increases from first axial body end 106 toward second axial body end 108. In a practical implementation strategy, the curvature of surfaces 126 and 127 may be compound within each of wall sections 124 and 125, meaning that more than one radius is defined by the respective surfaces within first wall section 124, and more than one radius within wall section 125. Outer wall surface 126 may define a second radius of curvature 130, a third radius of curvature 132 and a fourth radius of curvature 134. Each of radiuses 128, 130, and 132 may include a convex radius of curvature, whereas radius 134 may include a concave radius of curvature. Radius 128 may be equal to about 120 millimeters (mm), radius 130 may be equal to about 13 mm, and radius 132 may be equal to about 5 mm, whereas radius 134 may be equal to about 6 mm.

Inner wall surface 127 may analogously define a second, concave radius of curvature 138, a third, convex radius of curvature 140, and a fourth, convex radius of curvature 142. Radius 136 may be equal to about 117 mm, radius 138 may be equal to about 10 mm, radius 140 may be equal to about 4 mm, and radius 142 may be equal to about 10 mm. As used herein, the term "about" should be understood in the context of conventional rounding to a consistent number of significant digits. Accordingly, "about" 120 mm means from 115 mm to 124 mm, "about" 6 mm means from 5.5 mm to 6.4 mm, and so on.

The differently curved outer and inner wall surfaces 126 and 127 enable a gradual increase in radial thickness of body wall 124 moving from first axial body end 106 toward second axial body end 108. It may be also noted that first sealing ring 114 comprises about one half of the radial thickness of body wall 124 at first axial end 106. Second sealing ring 118 comprises a slightly lesser proportion of the radial thickness of body wall 124 at second axial end 120. A radial thickness of each of sealing rings 114 and 118 may be equal to about 1 mm. Each of sealing rings 114 and 118 may be cylindrical and metallic, formed of steel for example, but potentially also from relatively hard elastomeric materials. Seal body 100 may be elastomeric, and softer than materials of sealing rings 114 and 118. First sealing ring 114 may be positioned upon a shoulder 144 at first axial body end 106, whereas second sealing ring 118 may be positioned upon a second shoulder 146 at second axial body end 108. Each of sealing rings 114 and 118 may be molded integrally with the material forming seal body 100. First sealing ring 114 may further have an axial thickness which is greater than its radial thickness, and typically from about three to about four times greater. An axial thickness of second sealing ring 118 may also be greater than its radial thickness, from about one to about two times greater. The relatively thinner axial extent of sealing ring 118 may help promote the desired deformation of seal body 110 upon installation for service. A full width 152 or outer diameter dimension of boot seal 34 may be about 70 mm, more particularly about 66 mm in certain embodiments, whereas an inside width 154, corresponding to a width of opening 110 may be about 4 mm less than width 152. While these dimensional attributes provide a practical implementation strategy, the present disclosure is not thusly limited, and boot seal 34 can be expected to scale up or down in size, preserving the general shape and proportional attributes disclosed herein. It may further be noted from FIG. 5 that exposed outer radial surface 116 axially transitions with outer wall surface 126. Seal body 100 may further include an axial end surface 148. Exposed outer axial surface 120 may include a planar surface, which may radially transition with axial end surface 148. "Transition" means that, in profile, no radial or axial offset exists between surfaces of the respective components where radially or axially abutting, as the case may be, at least as would be apparent to the naked eye. Outer wall surface 126 may further include a substantially cylindrical, non-tapered section 150 which is part of longer wall section 124 and adjoins first sealing ring 114.

Figure 6:
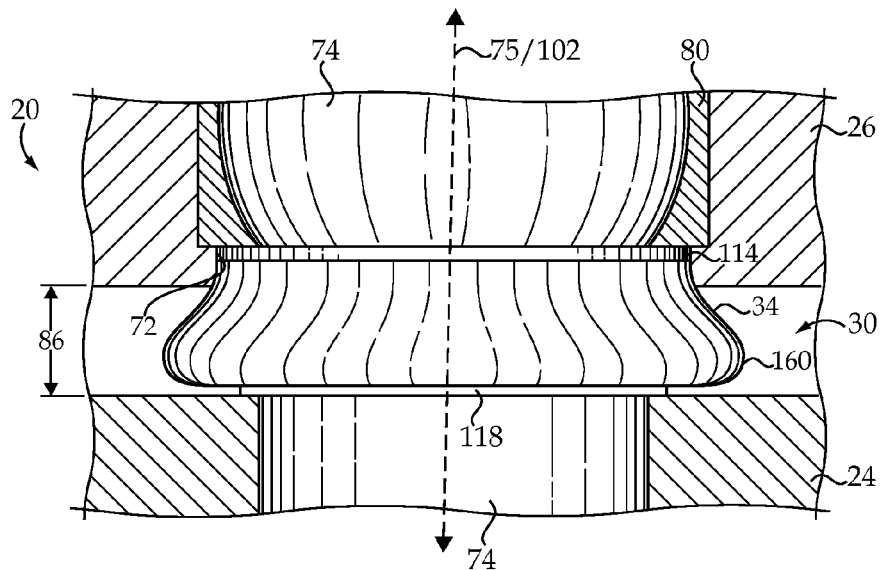
FIG. 6 is a partially sectioned side diagrammatic view of a portion of the machine system of FIG. 2.

Referring now to FIG. 6, there is shown joint assembly 30 as it might appear with boot seal 34 in its squished configuration having been axially compressed between components 24 and 26 where assembled for service. Radially outward bulge 160 has formed in boot seal 36, and stores an energy of the axial compression to bias second sealing ring against component 24. Center axis 102 overlaps with a longitudinal axis 75 defined by stud 74. It may be noted that radially outward bulge 160 is axially asymmetric, bulging predominantly downward in the FIG. 6 illustration. A clearance distance 86 between components 24 and 26 may be equal to about 15 mm, and a majority of an axial extent of bulge 160 is within the half of clearance 86 closer to component 24. In a practical implementation strategy, an axial height or body length of boot seal 34 may be reduced by about half from its rest configuration to reach the squished configuration shown in FIG. 6. It may also be noted that a width, or outer diameter dimension, of bulge 160 can be greater than the outer width or outer diameter dimension of first sealing ring 114.

It will be recalled that sealing ring 114 is positioned within socket eye 72. In a practical implementation strategy, sealing ring 114 may be interference fitted within socket eye 72 such that sealing ring 114 is fixed to rotate with component 26 throughout a finite angular pivoting range of component 26 relative to component 24. Components 26 and 24 may be configured to rotate relative to one another generally about axes 75 and 102, in an angular pivoting range that may be about 75° or greater. In certain instances, the angular pivoting range may be about 100°, in other words plus or minus about 50° from a neutral configuration. It will be recalled that the energy of compression stored via bulge 160 biases sealing ring 118 against component 24. The bias may be such that sealing ring 118 is fixed to rotate with component 24 through only a part of the angular pivoting range, and slips relative to component 24 through another part of the angular pivoting range. In a practical implementation strategy, sealing ring 118 may be fixed to rotate with component 24 through a minority of the angular pivoting range, and may slip relative to component 24 through a majority of the angular pivoting range. In a further practical implementation strategy, the minority of the angular pivoting range may be about 10°, or plus or minus about 5° from neutral.

Figure 7:
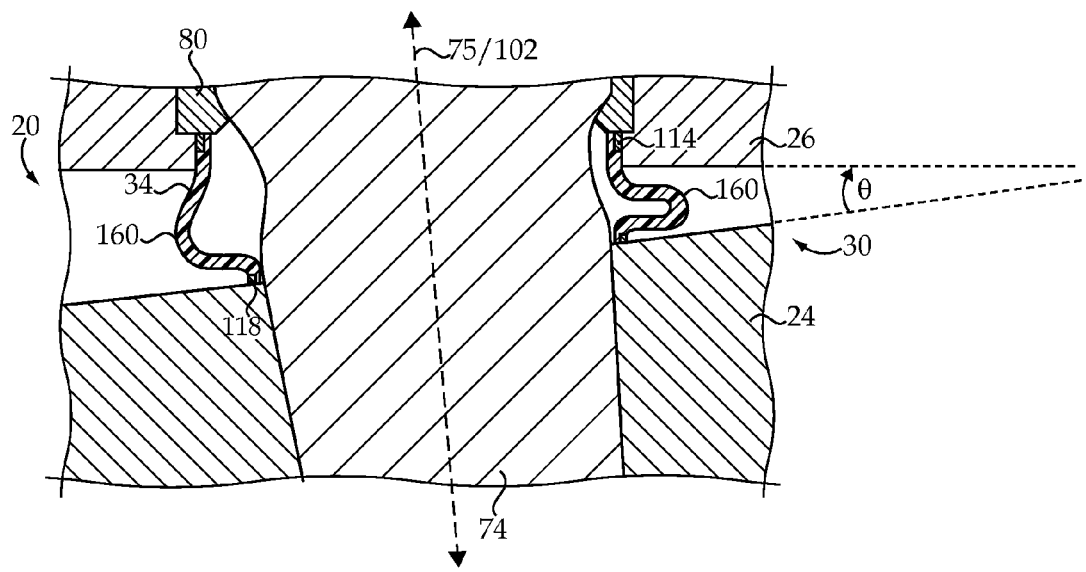
FIG. 7 is a sectioned side diagrammatic view similar to FIG. 6 with components of the machine system tilted relative to one another.

Referring now to FIG. 7, there is shown joint assembly 30 pivotably connecting components 24 and 26, and where components 24 and 26 have been tilted relative to one another. System 20 may be designed such that a certain amount of tilting between components 24 and 26 is tolerated during service. It is thus desirable to design boot seal 34 such that contact can be maintained between sealing ring 118 and component 24 throughout an angular tilt range, and of course between sealing ring 114 and component 26. It is further desirable that boot seal 34 be designed such that contact between sealing ring 118 and component 24 is maintained at extremes or mechanical stop limits of both the angular pivoting range and an angular tilt range between components 24 and 26. In FIG. 7, an angle θ is shown between components 24 and 26 and represents tilting in one direction to a stop limit of the angular tilt range. Angle θ may be about 4° or greater, such that the angular tilt range is about 8° or greater, and in certain embodiments about 12°. It may be noted that even at the limit of tilting depicted in FIG. 7, radially outward bulge is not in contact with either of components 24 and 26. The design of boot seal 34 may therefore be such that not only is sealing ring 118 maintained in contact with component 24 at stop limits of both the angular pivoting range and the angular tilt range, but also such that radially outward bulge 160 does not contact either of components 24 and 26 at the combined stop limits to ensure that boot seal 34 is unlikely to contact either of components 24 or 26 during service.

Industrial Applicability

Referring to the drawings generally, assembling a machine system such as system 10 may include contacting outer radial surface 116 of sealing ring 114 with component 26 in machine system 20, such as via interference fitting sealing ring 114 within socket eye 72. Interference fitting sealing ring 114 thusly can take place after stud 74 has been positioned within socket eye 72 along with bearing 80, but prior to attaching stud 74 to component 24. Component 24 may then be positioned about stud 74, and brought towards component 26 to contact outer axial surface 120 with component 24, and begin compressing boot seal 34 between first and second components 24 and 26. Prior to or upon commencing compressing of boot seal 34 in this manner, it may be in its rest configuration having curvilinear taper 22. As component 24 is advanced towards component 26 to reduce clearance 86, boot seal 34 may be compressed to its squished configuration, forming bulge 160 which stores an energy of the compression. The stored energy may bias sealing ring 118 against component 24. At this stage in assembly, each of sealing rings 114 and 118 may, together with material of seal body 100, fluidly seal between components 24 and 26. Assembly may continue by pivotably connecting first and second components 24 and 26, such as by threading a nut or the like onto stud 74 below component 24. This general procedure may be followed with respect to all of the joint assemblies in system 20 as the case may be.

Figure 8:
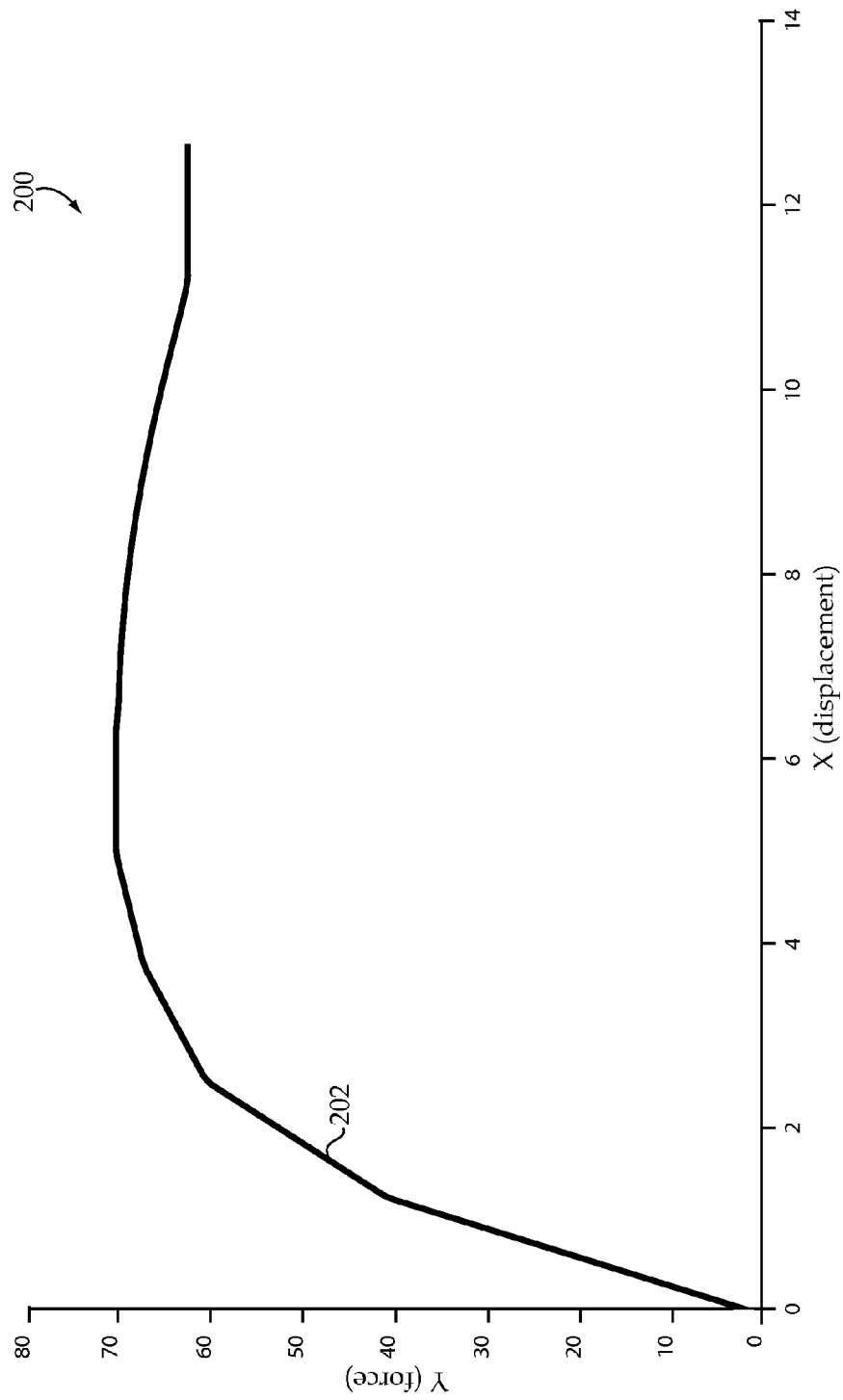
FIG. 8 is a graph of force versus displacement during installation of a boot seal, according to one embodiment.

Referring now to FIG. 8, there is shown a graph 200 including a curve 202 relating axial force (Newtons) to compress boot seal 34 on the Y axis to axial displacement (mm) of component 24 on the X axis. It may be noted that seal body 100 is relatively more difficult to axially compress initially, such as for the first 2 min or so, but becomes more easy to compress thereafter, and becomes easier still towards the full extent of desired compression, which may occur at or near 14 mm. Another way to understand what is represented by graph 200 is that axial compression of boot seal 34 is initially relatively difficult, and becomes increasingly difficult with further axial compression, but then becomes relatively easier to compress with further displacement, and when at about or slightly past one half of a full desired compression, the force needed to further compress boot seal 34 a given displacement actually begins to decrease. These phenomena differ from certain known boot seal designs, which much like springs tend to be harder and harder to compress as the total displacement increases, and as a result will typically differ from the present disclosure respecting the manner in which a desired axial biasing against a pivoting component could be obtained, if at all. FIG. 8 further conveys the feature of most of the energy of compression being stored in boot seal 34 during compressing boot seal 34 about half way to its squished configuration, such that relatively minor adjustments or mistakes in total axial displacement when boot seal is close to its squished configuration will have relatively little impact on the biasing force applied to sealing ring 118.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A machine system comprising:
   a first machine component;
   a second machine component that pivots relative to the first machine component in a finite angular pivoting range; and
   a joint assembly that connects the first machine component and second machine component,
   wherein the joint assembly includes a boot seal that provides a seal between the first machine component and the second machine component,
   wherein the boot seal:
      defines a center axis extending between a first axial end and a second axial end of the boot seal, and
      includes a first sealing ring and a second sealing ring,
   wherein the first sealing ring is positioned at the first axial end and includes an exposed outer radial surface in radial contact with the first machine component, the exposed outer radial surface axially transitions with an outer wall surface of a wall of the boot seal that extends along the center axis between the first axial end and the second axial end,
   wherein the second sealing ring is positioned at the second axial end and includes an exposed outer axial surface in axial contact with the second machine component, the exposed outer axial surface radially transitions inwardly with an axial end surface of the wall of the boot seal, and
   wherein the boot seal is held in axial compression between the first machine component and the second machine component and includes a radially outward bulge that stores an energy of the axial compression such that the second sealing ring is biased against the second machine component.

2. The machine system of claim 1, wherein the machine system includes a steering system for a ground engaging machine where the first machine component includes a linkage rod and the second machine component includes a steering arm actuated via the linkage rod.

3. The machine system of claim 2, wherein each of the first sealing ring and the second sealing is cylindrical,
   wherein the first sealing ring defines a first outer diameter dimension, and
   wherein the radially outward bulge has an axially asymmetric shape and defines a second outer diameter dimension greater than the first outer diameter dimension.

4. The machine system of claim 3, wherein the linkage rod includes a socket eye, and
   wherein the first sealing ring is interference fitted within the socket eye such that the first sealing ring is fixed to rotate with the linkage rod throughout the finite angular pivoting range.

5. The machine system of claim 4, wherein the second sealing ring is fixed to rotate with the steering arm through a minority of the finite angular pivoting range and slips relative to the steering arm through a majority of the finite angular pivoting range.

6. The machine system of claim 2, further comprising a center steering arm having a mounting shaft configured to couple with a frame of the ground engaging machine,
wherein the steering arm includes an outer steering arm configured to couple with a wheel assembly of the ground engaging machine.

7. The machine system of claim 2, further comprising:
a second linkage rod, and
a second joint assembly connecting the second linkage rod with the outer steering arm and including a second boot seal.

8. The machine system of claim 7, further comprising a hydraulic actuator configured to couple to the frame of the ground engaging machine and including the first linkage rod.

9. The machine system of claim 1, further comprising a ball,
wherein an inner surface of the first machine component defines a socket eye that receives the ball,
wherein a portion of the socket eye surrounds the first sealing ring, and
wherein the exposed outer radial surface is positioned in radial contact with the socket eye.

10. A boot seal for a joint assembly that can connect a first machine component and a second machine such that the first machine component can pivot relative to the second machine component in a finite angular pivoting range, the boot seal comprising:
a first axial body end that defines a first diameter circular opening;
a second axial body end that defines a second diameter circular opening, the second diameter circular opening being less than the first diameter circular opening;
a resilient seal body that defines a center axis and includes a body wall that extends circumferentially around the center axis and between the first axial body end and the second axial body end;
a first sealing ring positioned at the first axial body end and including an exposed outer radial surface positionable in radial contact with the first machine component, the exposed outer radial surface axially transitions with an outer wall surface of the body wall of the boot seal; and
a second sealing ring positioned at the second axial body end and having an exposed outer axial surface positionable in axial contact with the second machine component, the exposed outer axial surface radially transitions inwardly with an axial end surface of the body wall of the boot seal,
wherein the resilient seal body defines an axial body length,
wherein the body wall forms a curvilinear taper extending a majority of the axial body length from the first axial body end to the second axial body end in a rest configuration of the boot seal,
wherein the resilient seal body is deformable to a squished position in response to an axial compression of the boot seat, and
wherein the body wall forms a radially outward bulge storing an energy of the axial compression to bias the second sealing ring in the squished position.

11. The boot seal of claim 10, wherein the body wall further includes:
a longer wall section adjacent the first axial body end,
a shorter wall section adjacent the second axial body end, and
wherein the outer wall surface includes a convex axial profile within the longer wall section and a concave axial profile within the shorter wall section.

12. The boot seal of claim 11, wherein the body wall further includes an inner wall surface having a concave axial profile within the longer wall section, and a convex axial profile within the shorter wall section.

13. The boot seal of claim 12, wherein the convex axial profile of the outer wall surface defines a first radius of curvature,
wherein the concave axial profile of the inner wall surface defines a second radius of curvature that is less than the first radius of curvature, and
wherein a radial thickness of the body wall increases from the first axial body end toward the second axial body end.

14. The boot seal of claim 11, wherein the resilient seal body is elastomeric and each of the first sealing ring and the second sealing ring is metallic.

15. The boot seal of claim 11, wherein each of the first sealing ring and second sealing ring is cylindrical and positioned upon a shoulder formed in the resilient seal body at a corresponding one of the first axial end and the second axial end.

16. A method of assembling a machine system comprising:
contacting an exposed outer radial surface of a first sealing ring positioned at a first end of a boot seal with a first component in the machine system, the exposed outer radial surface axially transitioning with an outer wall surface of a wall of the boot seal that extends along a center axis of the boot seal;
contacting an exposed outer axial surface of a second sealing ring positioned at a second end of the boot seal with a second component in the machine system, the exposed outer axial surface radially transitioning inwardly with an axial end surface of the wall of the boot seal;
compressing the boot seal between the first component and the second component to deform the boot seal from a rest configuration having a curvilinear taper extending between the first end and the second end, to a squished configuration forming a bulge storing an energy of a compression of the boot seal;
biasing the second sealing ring against the second component via the energy of the compression of the boot seal; and
pivotably connecting the first component with the second component in a finite angular pivoting range, such that the boot seal is held in the squished configuration therebetween.

17. The method of claim 16, wherein the first component includes a linkage rod and the second component includes a steering arm, and
wherein the contacting the exposed outer radial surface includes interference fitting the first sealing ring into a socket eye in the linkage rod such that the first sealing ring is fixed to rotate with the linkage rod through the finite angular pivoting range.

18. The method of claim 17, wherein the biasing includes biasing the second sealing ring such that the second sealing ring is fixed to rotate with the steering arm through a minority of the finite angular pivoting range, and slips relative to the steering arm through a majority of the finite angular pivoting range.

19. The method of claim 18, wherein the biasing includes biasing the second sealing ring such that the contact between the second sealing ring and the steering arm is maintained at stop limits of both the finite angular pivoting range and an angular tilt range between the steering arm and the linkage rod.

20. The method of claim 19, wherein the finite angular pivoting range is about 75° or greater, and the angular tilt range is about 8° or greater.

21. A machine system comprising:
a first machine component;
a second machine component that pivots relative to the first machine component in a finite angular pivoting range;
a joint assembly that connects the first machine component and second machine component; and
a steering system for a ground engaging machine,
wherein the joint assembly includes a boot seal that provides a seal between the first machine component and the second machine component,
wherein the boot seal:
defines a center axis extending between a first axial end and a second axial end of the boot seal, and
includes a first sealing ring and a second sealing ring,
wherein the first sealing ring is positioned at the first axial end in radial contact with the first machine component,
wherein the second sealing ring is positioned at the second axial end in axial contact with the second machine component,
wherein the boot seal is held in axial compression between the first machine component and the second machine component and includes a radially outward bulge that stores an energy of the axial compression such that the second sealing ring is biased against the second machine component, and
wherein the machine system includes a steering system for a ground engaging machine where the first machine component includes a linkage rod and the second machine component includes a steering arm actuated via the linkage rod.

22. A method of assembling a machine system comprising:
contacting an outer radial surface of a first sealing ring positioned at a first end of a boot seal with a first component in the machine system;
contacting an outer axial surface of a second sealing ring positioned at a second end of the boot seal with a second component in the machine system;
compressing the boot seal between the first component and the second component to deform the boot seal from a rest configuration having a curvilinear taper extending between the first end and the second end, to a squished configuration forming a bulge storing an energy of a compression of the boot seal;
biasing the second sealing ring against the second component via the energy of the compression of the boot seal; and
pivotably connecting the first component with the second component in a finite angular pivoting range, such that the boot seal is held in the squished configuration therebetween,
wherein the first component includes a linkage rod and the second component includes a steering arm, and
wherein the contacting the outer radial surface includes interference fitting the first sealing ring into a socket eye in the linkage rod such that the first sealing ring is fixed to rotate with the linkage rod through the finite angular pivoting range.

\* \* \* \* \*